UNITED STATES PATENT OFFICE.

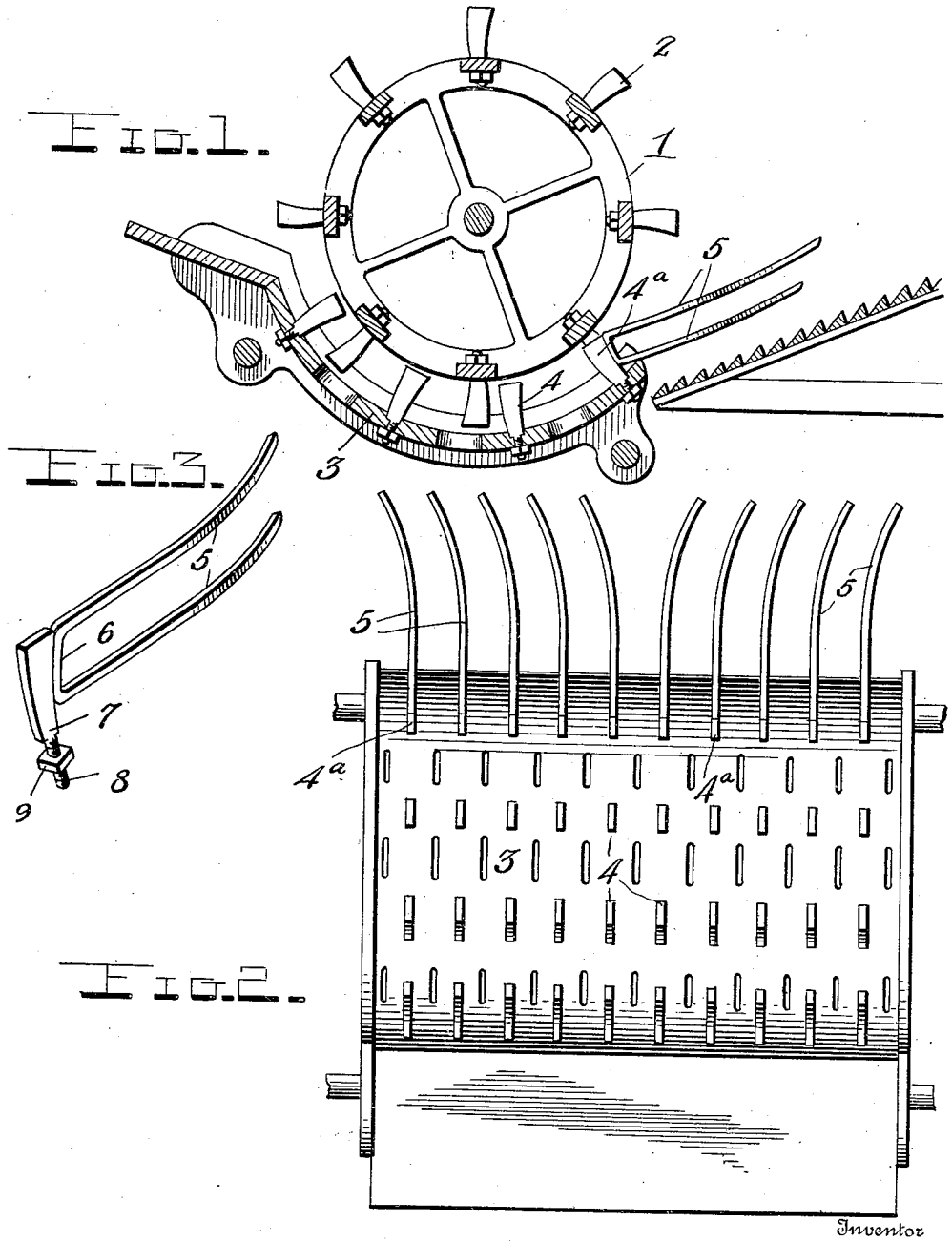

CHARLES A. BROST, OF KENMARE, NORTH DAKOTA, ASSIGNOR OF ONE-FOURTH TO PERCY M. CLARK, AND ONE-FOURTH TO JOHN J. P. MARQUETTE, OF KENMARE, NORTH DAKOTA.

THRESHING-MACHINE ATTACHMENT.

No. 923,324.      Specification of Letters Patent.      Patented June 1, 1909.

Application filed November 14, 1908. Serial No. 462,700.

*To all whom it may concern:*

Be it known that I, CHARLES A. BROST, a citizen of the United States, residing at Kenmare, in the county of Ward and State of North Dakota, have invented certain new and useful Improvements in Threshing-Machine Attachments, of which the following is a specification, reference being had to the accompanying drawings.

This invention relates to improvements in threshing machine attachments and more particularly to an improved means for spreading the straw arranged in the space immediately in rear of the concave and beneath the cylinder, so as to utilize the action of the cylinder to spread the straw outwardly from the center and toward the sides of the machine to distribute the same evenly over the grate and straw racks.

The object of the invention is to provide a spreading device of this character which will be simple and practical in construction and highly effective in accomplishing its intended purpose.

With the above and other objects in view, the invention consists of the novel features of construction and the combination and arrangement of parts hereinafter fully described and claimed, and illustrated in the accompanying drawings, in which—

Figure 1 is a sectional view showing the application of the invention to a threshing machine of well known form; Fig. 2 is a plan view of the concave showing the invention applied; and Fig. 3 is a perspective view of one of the spreading members.

Referring more particularly to the drawings, 1 denotes a rotary cylinder having teeth 2 and 3 denotes a cylinder concave having teeth 4. These parts are of well known form and construction and form no part of the present invention.

5 denotes the improved straw spreading fingers arranged in the space between the cylinder and concave and at the immediate rear of the concave, all the fingers upon one side of the center or longitudinal axis of the machine extending in the same direction toward said side while the others extend in an opposite direction or toward the other side of the machine, as clearly shown in Fig. 2. Said fingers occupy the space between the cylinder and the rear of the concave, through which the straw passes, and in order to support them they are preferably attached to and project from the rearmost row of concave teeth 4ª. Preferably two or more of said fingers project from each of the teeth 4ª and they are superposed so as to occupy the portions of the space through which the straw is forced by the teeth of the cylinder as it leaves the concave. The fingers 5 have their inner portions which lie within the line of movement of the cylinder teeth, straight, but they are curved longitudinally in a lateral direction shown in Fig. 2. The cylinder rotates at a high speed so that the straw is thrown from the same and the concave with considerable force and owing to the longitudinal curvature of the fingers and to the opposite inclination of the fingers on opposite sides of the longitudinal center of the machine, such force will be effectively utilized to spread the straw toward the sides of the machine and evenly over the grate and straw rack. It is essential to my invention that all the fingers on one side of the longitudinal center of the machine be inclined toward such side while those upon the other side are inclined in the opposite direction or toward the other side and it is essential that they be arranged in the space between the cylinder and concave, through which space the straw is forced by the teeth of the cylinder, and it is immaterial as to whether the fingers are curved longitudinally in a vertical plane or straight and also as to the number of fingers superposed and also as to the supporting or mounting of the fingers. The preferred construction and mounting of the fingers is illustrated in Fig. 3 of the drawings, in which a metal rod is bent upon itself adjacent its center or into substantially U-form and has its closed end 6 welded or otherwise secured to the rear edge of one of the concave teeth 4ª. Such tooth 4ª is of the usual form having a squared or flattened portion 7 to enter a similar shaped socket in the concave whereby the tooth will be prevented from turning axially and said tooth also having a screw threaded stem or shank 8 which passes through an opening in the concave 3 and receives a retaining nut 9.

In operation, the grain fed between the cylinder and concave will be threshed by the teeth 2, 4 of such parts and the teeth 2 of the cylinder will force the straw between and rearwardly from the rear set of concave teeth 4ª with considerable force through the space above the rear of the concave.

Owing to the peculiar disposition of the separating fingers 5 in this space and to the movement of the cylinder teeth between said fingers, the straw passing between the fingers will be forced laterally from the center toward the sides of the machine so that it will be spread out to the full width of the rack and other straw racks of the machine, which racks are usually broader than the width of the cylinder and concave. The opposite inclination of the fingers on opposite sides of the center of the machine and their arrangement in the space beneath and at the rear of the cylinder, through which space the teeth of the cylinder travel, insures an effective spreading of the straw in a lateral direction and in an even uniform layer over the grate and the straw racks and, consequently, a more perfect separation of the grain from the straw. This peculiar construction and arrangement of the fingers also causes them to hold the straw up to the teeth of the cylinder so as to be effectively acted upon by the latter, and prevents clogging of damp straw at the rear of the concave and above the grate. The movement of the cylinder teeth 2 through the space in which the spreading fingers 5 are arranged also insures the thorough and effective clearing of the straw therefrom.

Having thus described the invention what is claimed is:

1. The combination with a cylinder provided with teeth and a concave provided with co-acting teeth, of spreading fingers secured to and projecting rearwardly from the rearmost teeth of the concave and arranged in the space between the cylinder and the rear of the concave, through which space the straw is forced by the direct action of the teeth of the cylinder, the fingers on one side of the longitudinal center of the machine being inclined toward such side and the remaining fingers being inclined in an opposite direction or toward the other side of the machine.

2. As an article of manufacture, a tooth for a thresher concave provided with a U-shaped member secured at its closed end to one edge of the tooth and having its spaced ends projecting laterally from said tooth to provide spreading fingers.

3. The combination with a toothed cylinder and a toothed concave, of a plurality of groups of superposed spreading fingers arranged in the space between the cylinder and the rear portion of the concave through which space the straw is forced by the direct action of the teeth of the cylinder, all the fingers on one side of the longitudinal center of the machine being inclined toward such side and the remaining fingers being inclined in an opposite direction or toward the other side of the machine.

4. The combination with a toothed cylinder and a toothed concave, of U-shaped members united at their closed ends to the rear edges of the rearmost teeth in the concave and having their ends or arms superposed and extending rearwardly and upwardly through the space between the cylinder and the rear of the concave, through which space the straw is forced by the direct action of the teeth of the cylinder, all the fingers upon one side of the longitudinal center of the machine being inclined laterally toward such side and the remaining fingers being inclined in an opposite direction or toward the other side of the machine.

In testimony whereof I hereunto affix my signature in the presence of two witnesses.

CHARLES A. BROST.

Witnesses:
ANNA SIMONSON,
WINNIE HOWELL.